March 1, 1960 G. E. BAKER 2,927,290
TRANSDUCER
Filed June 9, 1958 4 Sheets-Sheet 1
FIG_1
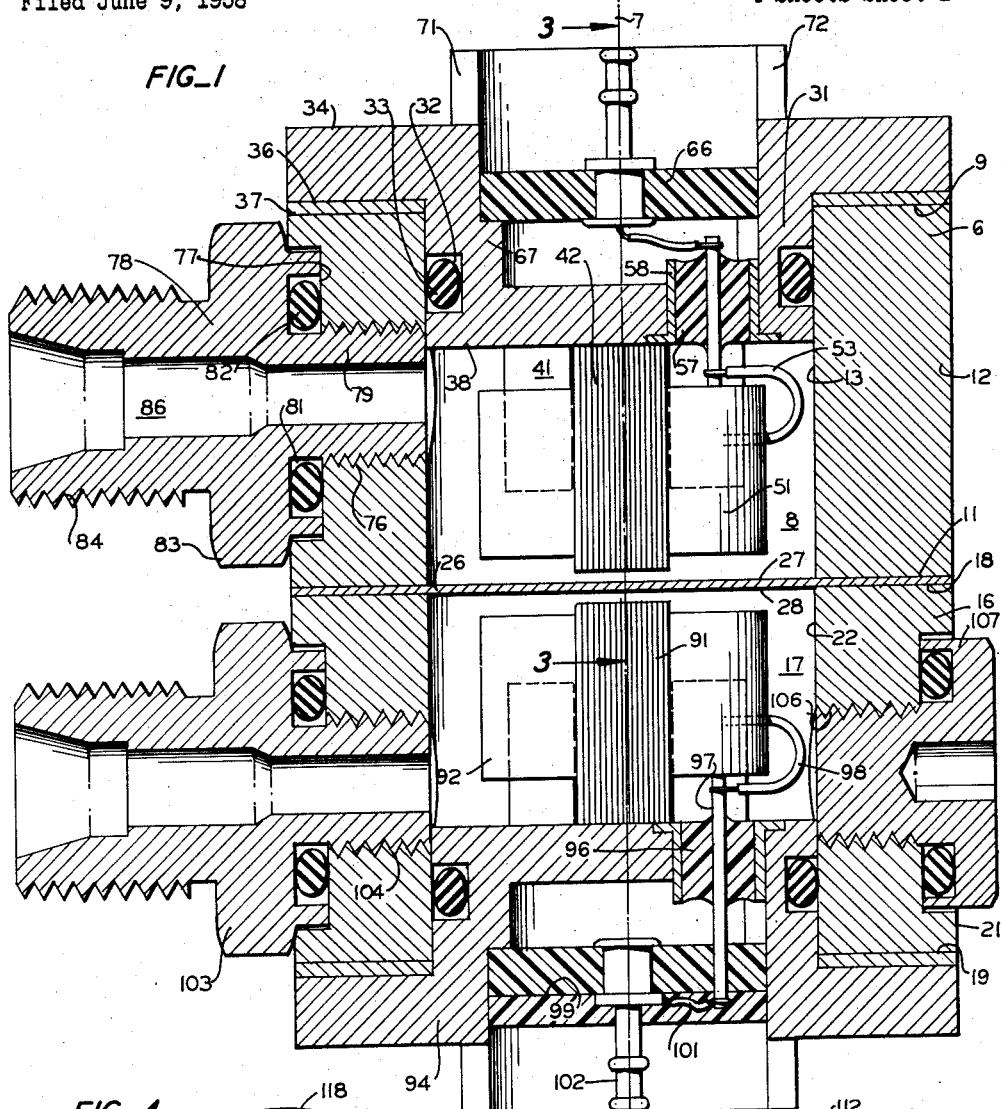
FIG_4
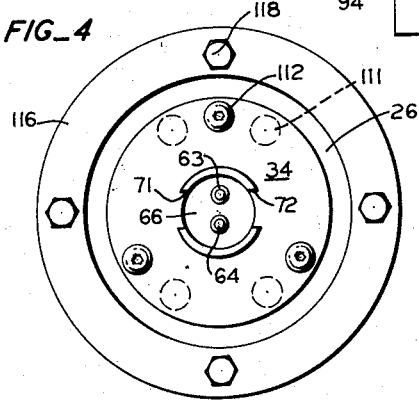
FIG_5
INVENTOR.
GEORGE E. BAKER
BY Lathrop & West
ATTORNEYS March 1, 1960 G. E. BAKER 2,927,290
TRANSDUCER
Filed June 9, 1958 4 Sheets-Sheet 2
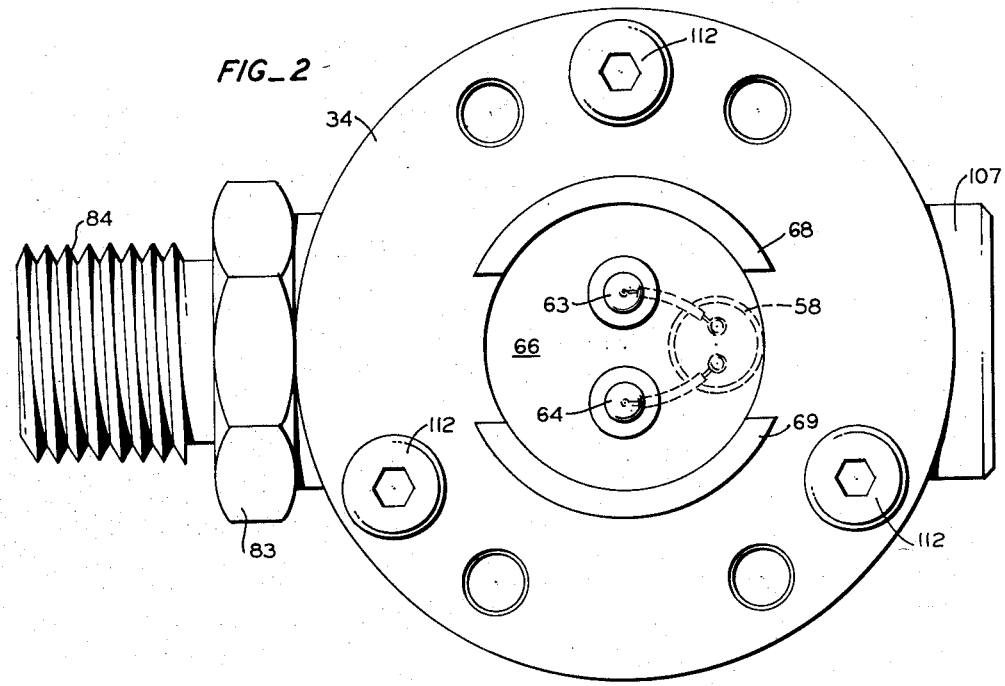
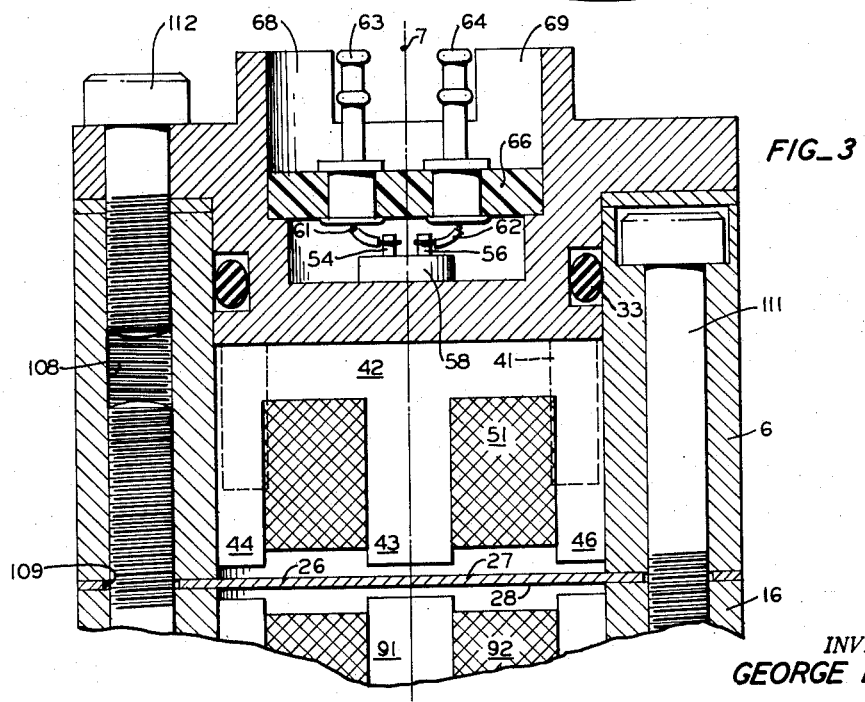
INVENTOR.
GEORGE E. BAKER
BY *Lothrop & West*
ATTORNEYS March 1, 1960 — G. E. BAKER — 2,927,290
TRANSDUCER
Filed June 9, 1958 — 4 Sheets-Sheet 3
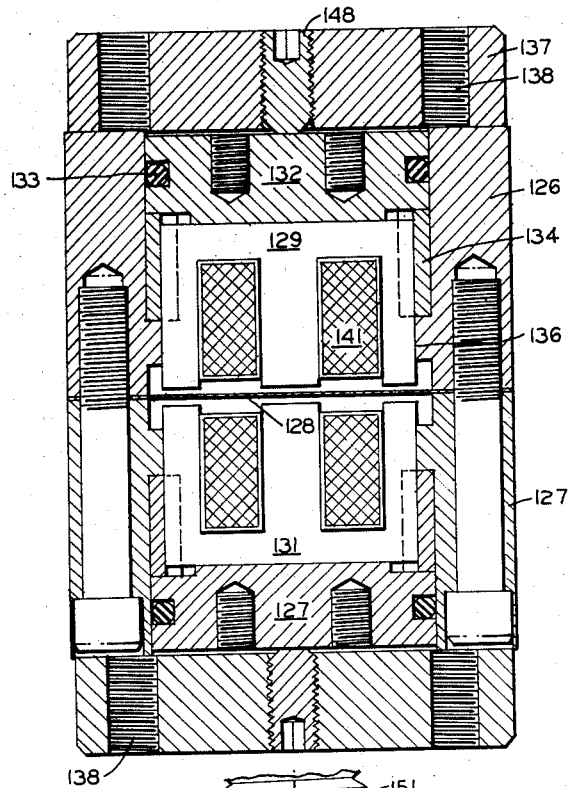
FIG_7
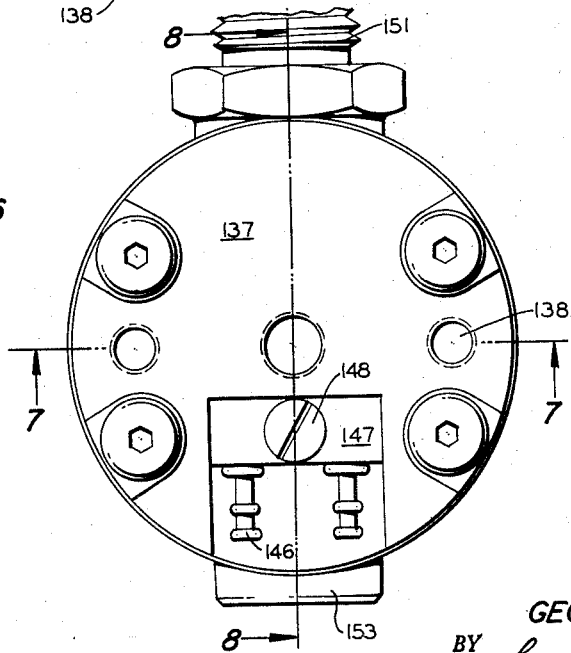
FIG_6
INVENTOR.
GEORGE E. BAKER
BY Lothrop & West
ATTORNEYS March 1, 1960 G. E. BAKER 2,927,290
TRANSDUCER
Filed June 9, 1958 4 Sheets-Sheet 4
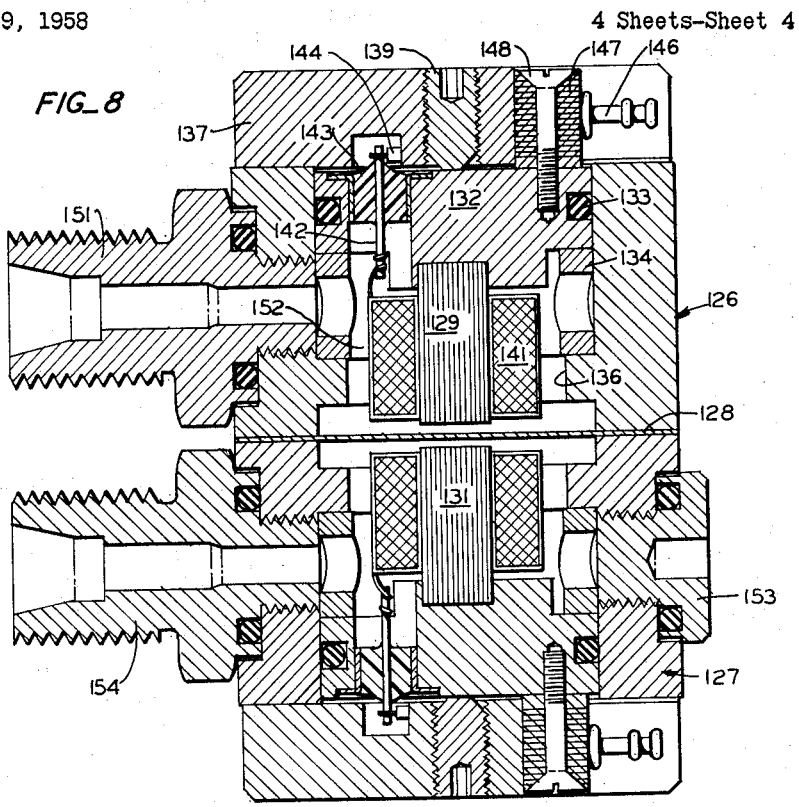
FIG_8
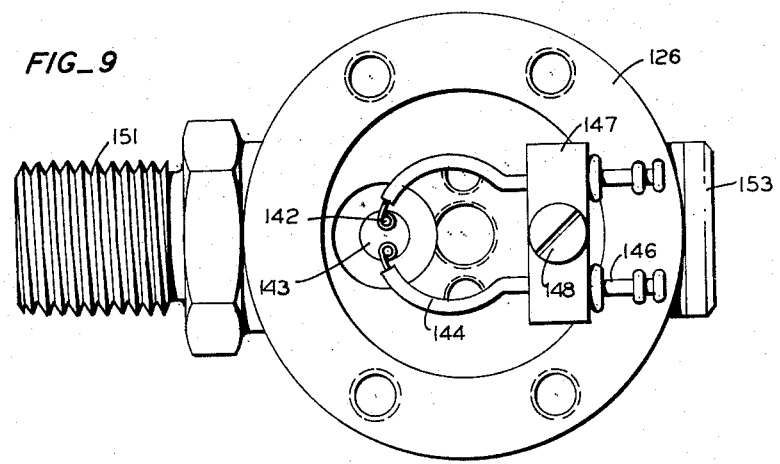
FIG_9
INVENTOR.
GEORGE E. BAKER
BY Lothrop & West
ATTORNEYS United States Patent Office 2,927,290
Patented Mar. 1, 1960

2,927,290

TRANSDUCER

George E. Baker, Napa, Calif., assignor to Yuba Consolidated Industries, Inc., a corporation Application June 9, 1958, Serial No. 740,707

3 Claims. (Cl. 336—30)

My invention relates to devices effective to convert one variable into another, particularly for scientific and technical work. In the present instance the transducer is particularly designed for use in missile and extra-terrestrial operation and is primarily for the purpose of converting a pressure valve or especially a difference between two pressures into one or more electrical signals.

It is an object of the invention to provide a pressure-electrical transducer effective to give accurate conversion of an incoming signal to an outgoing signal.

Another object of the invention is to provide a pressure-electrical transducer substantially unaffected by ambient temperature throughout a relatively wide range.

Another object of the invention is to provide a transducer in which large pressure differences, even those beyond the translating capacity of the instrument, do not result in any injury to the instrument.

A further object of the invention is to provide a transducer that is extremely rugged despite high accelerations and changes in surrounding circumstances.

A still further object of the invention is to provide a transducer of relatively small size and light weight.

An additional object of the invention is to provide a transducer easily handled and readily incorporated in various test mechanisms.

Another object of the invention is to provide a transducer that can readily be fabricated and is benefited by special fabrication techniques.

Other objects of the invention, together with the foregoing, are attained in the embodiments of the invention described in the accompanying description and illustrated in the accompanying drawings in which:

Figure 1 is a cross section on an axial plane through one form of transducer according to the invention, the scale of the drawing being several times the customary size of the device;

Figure 2 is an elevation of the upper end of the structure of Figure 1;

Figure 3 is a cross section the plane of which is indicated by the line 3—3 of Figure 1, portions of the device being broken away;

Figure 4 is a diagrammatic end view of the device of Figure 1 in one stage of fabrication, the scale being reduced;

Figure 5 is a diagrammatic side elevation illustrating a step in the fabrication of the transducer;

Figure 6 is an end elevation of a modified form of transducer in accordance with the invention;

Figure 7 is a cross section the plane of which is indicated by the line 7—7 of Figure 6;

Figure 8 is a cross section the plane of which is indicated by the line 8—8 of Figure 6; and Figure 9 is a view of the other end of the form of transducer shown in Figures 6 to 8.

While the transducer of the invention may be utilized to convert a number of different signals, it is especially useful in converting a pressure; or usually, a pressure difference, into an electrical signal which can be ultimately observed through a bridge, amplifier and indicator arrangement. It is therefore so described herein as one example. In this arrangement there is provided an upper body 6 conveniently fabricated of metal in the form of a circular cylinder or annulus having an axis 7 and defining an interior upper cavity 8. The upper body 6 at one end terminates in an upper plane surface 9 and at the other end terminates in a lower plane surface 11 parallel to the surface 9, both surfaces being normal to the axis 7. Preferably the exterior of the upper body 6 is turned to a circular cylindrical outer surface 12 whereas the upper cavity 8 is in part defined by an interior circular cylindrical surface 13.

Coaxially situated is a lower body 16 generally quite similar to the upper body 6 and also including an annulus defining a lower cavity 17. The lower body 16 terminates at one end in an upper plane surface 18 and at the other end in a lower plane surface 19. The outside of the body is turned to a circular cylindrical outer surface 21 whereas the inner wall 22 is similarly of circular cylindrical contour.

Interposed between the coaxial upper body 6 and lower body 16 and spanning the upper cavity 8 as well as the lower cavity 17 is a planar diaphragm 26 fabricated of a material capable of perturbing a magnetic field, herein referred to as a magnetic material. The diaphragm 26 is defined by a plane upper surface 27 adapted to meet with the surface 11 in substantially air tight abutment and is also defined by a plane lower surface 28 adapted to meet with the plane surface 18 in substantially air tight abutment.

Designed to be in part received within the upper cavity 8 is an upper plug 31 usually of metal and having a peripheral groove 32 within which a pressure seal such as a sealing ring 33 is situated in order to preclude leakage between the adjacent surfaces of the upper plug and the upper body 6. At one end the upper plug is enlarged to afford an outstanding flange 34 having a planar lower face 36 designed to overlie the upper face 9 and to be positioned thereon except for an intervening spacer, shim or washer 37. The thickness of the shim or washer 37 establishes the axial location of the mounting surface 38 of the upper plug 31 with respect to the position of the diaphragm 26.

Four quadrant projections 41 are formed integrally with the upper plug 31 and depend therefrom to serve as guides for a magnetic pole piece 42. A series of laminations of magnetic metal, having the outline of an E, form the pole piece 42, disposed within the quadrants 41 in such a fashion that the central member 43 of the pole piece as well as the two end members 44 and 46 thereof are all disposed in close relationship with the diaphragm 26 in order that the pole piece 42 and the diaphragm 26 together can constitute a magnetic circuit.

The E-shaped laminated pole piece is confined between the supports 41 by firm frictional engagement therewith and with the assistance of a suitable solder bond. Solder bonds also unite portions of the laminations. The ends of the branches 43, 44 and 46 of the pole piece are substantially co-planar and are approximately parallel to the diaphragm 26.

Inter-related with the pole piece 42 is an upper electric coil 51 surrounding the central member 43 and having terminals 53 extending to conductors (Figure 3) 54 and 56 secured in a glass insulator 57. This has a metallic sheath 58 anchored in an air tight fashion in the plug 31. To the conductors 54 and 56 are fastened leads 61 and 62 of a flexible nature leading to terminal fastenings 63 and 64 or conductors mounted in an insulator disc 66 pressed against a shoulder 67 forming part of the plug 31. Protecting walls 68 and 69 extend upwardly at least to the height of the terminal connectors 63 and 64 in order to protect them against mechanical injury. Cutaway portions 71 and 72 afford easy access for conductors (not shown) to be secured to the terminal members 63 and 64.

Since the cavity 8 is air tight, special means are provided to establish or vary the pressure therein. At a convenient location the body 6 is provided with a drilled and tapped passageway 76 and a counterbored portion 77 affording a flat shoulder. In this passageway is fastened a connector 78 including a threaded end 79 merging with a groove 81 in which a sealing ring 82 is situated. A wrench portion 83 is provided between the ends of the fitting which terminates in a threaded connector 84. A passageway 86 through the device affords access to the cavity 8 so that when any suitable pressure varying structure is connected to the connector 84 the pressure existing continuously or instantaneously within the cavity 8 may be established or varied as desired.

The lower body 16 is in general constructed exactly as is the upper body 6 as to the provision of a lower pole piece 91 complete with a lower coil 92 thereon. The lower pole piece is seated in a plug 94 carrying an insulator 96 through which conductor bars 97 extend. These are connected by leads 98 to the coil 92 and are long enough to extend through an insulator disc 99 and to be connected by flexible leads 101 to terminal members 102. Insulating compound may be laid over the disc 99, if desired.

A connector 103 identical with the connector 78 affords access to the cavity 17 in order that the pressure therein may be established or varied as desired. While the upper body 6 usually has but one threaded bore 76, the lower body 16 not only has a threaded bore 104 for the connector 103 but also, as an example, is provided with a threaded bore 106 for a removable sealing plug 107. In some instances the fitting 103 is replaced by a plug similar to the plug 107 so that the cavity 17 is isolated. This isolation can occur after a set pressure (vacuum) is established within the cavity 17 so that the cavity is maintained indefinitely at a pressure useful as a reference or datum pressure.

To hold the various members together, particularly the diaphragm 26, the upper body 6, the lower body 16 and the plugs 31 and 94, suitable fastening screws are provided. The bodies 6 and 16 are provided with aligned threaded holes 108 and suitable holes 109 are pierced through the diaphragm 26. Long screws 111 with socket heads pass from one body into the other, the screws being alternately inserted from opposite ends. The long screws are shorter than the combined length of the threaded holes 108. Short screws 112 are passed through the suitably apertured flanges 34 of the upper plug 31 and of the lower plug 94 and through any intervening washer into the remaining portions of the threaded holes 108.

In the initial assembly of the device, the parts are preferably put loosely together with a diaphragm 26 which is preliminarily of considerably greater diameter, as shown in Figures 4 and 5, than it is in its finished form. A diaphragm disc 26 of extra large diameter is firmly clamped in a pair of assembly rings 116 and 117 by means of bolts and nuts 118. The rings and the exposed portion of the diaphragm 26 are heated by any suitable means, diagrammatically indicated as a heating torch 119, so that the rings and the diaphragm expand but the rings expand most so that the diaphragm itself is placed under a substantially uniform tension in all directions. This tends to flatten the diaphragm, making it entirely planar, removing any minor waves or undulations, and to prestress it in all radial directions under tension.

While the diaphragm is so stressed and flattened, the fastenings 111 are tightened so that the stretched diaphragm is tightly clamped between the upper body 6 and the lower body 16, the apertures through the diaphragm accommodating the fastenings 111 being sufficiently large for this. Following the clamping of the stressed diaphragm, the rings 116 and 117 are removed and the projecting portion of the diaphragm is cut off substantially flush with the outer surfaces 12 and 21.

In the customary installation, the connectors 63 and 64 as well as the connectors 102 are included in bridge or amplifier circuits or both and extend to an appropriate indicator or indicators. If the cavity 17 is completely plugged, the pressure therein is used as a fixed reference pressure while the connector 78 can extend to a source of unknown or variable pressure. As an alternative, both connectors 78 and 103 can be connected to sources of relatively variant pressures.

However the transducer is connected, a difference of pressure within the cavity 8 with respect to the pressure within the cavity 17 is effective to move the diaphragm 26 from a central or neutral or datum position between the pole pieces 42 and 91 into another position closer to one pole piece than the other. This shift in position of the diaphragm 26 causes a corresponding perturbation of the magnetic field or magnetic circuit between the pole pieces and including the diaphragm so that the electrical flow in the connected bridge circuit is correspondingly varied to produce a corresponding change in indication.

In the event the pressure differences between the cavity 8 and the cavity 17 are very great or change very suddenly, the diaphragm 26 may be displaced far enough actually to come into mechanical contact with the substantially planar end of the member 43 or the corresponding member of the pole piece 91. While the device is not intended to afford an accurate indication while operated in this way, rupture of the diaphragm is prevented since extra mechanical support for the excess pressure is so provided. This is also important for long life under conditions of high acceleration as well as excessive pressure.

The materials of the transducer are preferably chosen and arranged so that variations in temperature over a wide range are ineffective or substantially so to produce any variation in indication. Temperature effects are substantially ruled out and the indication is almost entirely that of pressure. The provision of well-fixed terminals, such as 63 and 64, the provision of separate insulators such as 57 and the use of flexible leads all tend to prevent mechanical damage to the interior of the device due to rough handling and permit replacement of the exterior terminals in the event of breakage without disturbing or destroying the interior setting of the structure. There has consequently been provided in this form of apparatus a relatively small, light weight, extremely stable and sturdy pressure-electrical transducer of high accuracy.

An alternate form of device, as shown in Figures 6 to 9 inclusive, incorporates a similar upper body 126, a similar lower body 127 and a comparable intervening diaphragm 128. There is a similar E-shaped upper pole piece 129 and a corresponding lower pole piece 131. The upper pole piece 129 is mounted in an upper plug 132 which has a peripheral seal 133 as before but does not have an outstanding flange. The plug 132 rests against a spacer ring 134 bearing against an in-turned shoulder 136 formed in the upper body 126. A cap plate 137 is secured to the body 126 by appropriate fasteners 138 and carries a central set screw 139 which, when tightened, forces the plug 132 against the spacer 134 and so positions the pole piece 129 with respect to the diaphragm 128.

An upper coil 141 is mounted on the upper pole piece 129 and has conductors 142 extending through insulators 143 mounted in the upper plug 132 and connected by flexible leads 144 to terminals 146 projecting from a block 147 secured to the plug 132 by a fastening screw 148. A fitting 151 is mounted on the upper body 126 and affords communication with the upper interior cavity 152.

A comparable arrangement is provided for the lower body 127. In addition, this has a plug closure 153 as well as a pressure fitting 154, the other parts being substantially as described in connection with the upper body 126.

The fabrication and operation of this modification are substantially the same as previously described with the exception that instead of changing washers such as the washer 37 in order to vary the position of the pole pieces with respect to the diaphragm, in this instance the spacer 134 is replaced by a different spacer. In both instances, there is provided a superior transducer attaining the objects of the invention and operating in an improved manner.

What is claimed is:

1. A transducer comprising an upper body in the form of an annulus having an upper cavity partly defined by a cylindrical wall symmetrical about an axis; said upper body having an inner plane face and an outer plane face normal to said axis; a lower body in the form of an annulus having a lower cavity partly defined by a cylindrical wall symmetrical about said axis; said lower body having an inner plane face and an outer plane face normal to said axis; a planar magnetic diaphragm adapted to be interposed between said upper body and said lower body in abutment with said inner faces; an upper plug axially movable within said upper cavity; a pressure seal on said upper plug engaging the adjacent cylindrical wall; a flange on said upper plug overlying said outer plane face of said upper body; an upper spacer interposed between said outer plane face of said upper body and said flange on said upper plug; an electromagnet on said upper plug and movable therewith axially toward and away from said diaphragm; a lower plug axially movable within said lower cavity; a pressure seal on said lower plug engaging the adjacent cylindrical wall; a flange on said lower plug overlying said outer plane face of said lower body; a lower spacer interposed between said outer plane face of said lower body and said flange on said lower plug; an electromagnet on said lower plug and movable therewith axially toward and away from said diaphragm; means forming openings from said cavities to the outside of said upper body and said lower body; and fastening means extending through and holding together said flanges, said spacers, said upper body and said lower body, and said diaphragm.

2. A transducer comprising a body in the form of an annulus having a cavity partly defined by a cylindrical wall symmetrical about an axis; said body having an inner plane face and an outer plane face normal to said axis; a planar magnetic diaphragm adapted to abut said inner plane face; a plug axially movable within said cavity; a pressure seal on said plug engaging the adjacent cylindrical wall; a flange on said plug overlying said outer plane face; a spacer interposed between said outer plane face of said body and said flange; an electromagnet on said plug and movable therewith toward and away from said diaphragm; means forming an opening from said cavity to the outside of said body; and fastening means extending through and holding together said flange, said spacer, said body, and said diaphragm.

3. A transducer plug for use with a body in the form of an annulus having a cavity partly defined by a cylindrical wall symmetrical about an axis and having an outer plane face normal to said axis, said plug comprising a member having a cylindrical portion symmetrical with said axis and slidable within said cavity, means forming a circumferential groove around said member, a pressure seal within said groove, a flange on said member normal to said axis and adapted to overlie said outer plane face, means defining an inner face on said member normal to said axis and on the opposite side of said groove from said flange, quadrant projections on said member outstanding from said inner face, an electromagnet mounted on said member and partly disposed between said projections, means defining a recess having a shoulder in said member, an insulator disc in said recess and on said shoulder, an insulator in said member and extending between said recess and said inner face, conductors in said insulator disc and said insulator, and means for connecting said electromagnet to said conductors in series.

References Cited in the file of this patent

UNITED STATES PATENTS

| | | |
|---|---|---|
| 2,641,742 | Wolfe | June 9, 1953 |
| 2,683,989 | Clark | July 20, 1954 |
| 2,840,675 | Di Giovanni | June 24, 1958 |